United States Patent [19]
Voitik

[11] 3,819,191
[45] June 25, 1974

[54] SEALING RING ASSEMBLY FOR ROTARY FACE SEAL

[75] Inventor: Robert M. Voitik, Glenview, Ill.

[73] Assignee: Innovatex Corporation, Glenview, Ill.

[22] Filed: June 26, 1972

[21] Appl. No.: 266,451

[52] U.S. Cl. .................................. 277/22, 277/39
[51] Int. Cl. ........................................ F16j 15/40
[58] Field of Search ............. 277/22, 25, 26, 41, 84, 277/39

[56] References Cited
UNITED STATES PATENTS

| | | | |
|---|---|---|---|
| 2,494,887 | 1/1950 | Lenhart | 277/22 |
| 2,799,522 | 7/1957 | King et al. | 277/22 X |
| 2,840,350 | 6/1958 | Pierce | 277/22 X |
| 2,917,329 | 12/1959 | Laser | 277/26 |

Primary Examiner—Samuel B. Rothberg
Attorney, Agent, or Firm—Edward U. Dithmar

[57] ABSTRACT

A sealing ring assembly for cooperation with a rotatable shaft and a mating ring to provide a rotary face seal, the assembly comprising a sealing ring having inner cylindrical and lateral flat sealing surfaces possessing a high degree of smoothness, and a stabilizing ring snugly engaging the outer cylindrical surface of the sealing ring. The stabilizing ring has integral circumferential fin means which reinforce the ring so as better to resist centrifugal and thermal expansion forces tending to distort the cylindrical and flat sealing surfaces of the sealing ring. The fin means also serves as a heat dissipating mechanism, thereby effectively reducing the distorting forces resulting from thermal expansion.

4 Claims, 4 Drawing Figures

PATENTED JUN 25 1974　　　　　　　　　　　　　　　　　　3,819,191

SEALING RING ASSEMBLY FOR ROTARY FACE SEAL

BACKGROUND OF THE INVENTION

This invention relates to rotary face seals, and more particularly to an improved sealing ring assembly which cooperates with a rotatable shaft and a mating ring to provide a rotary seal for use between the rotatable shaft and a stationary housing.

The closest prior art known to applicant is U.S. Pat. No 2,917,329, dated Dec. 15, 1959. The counterpart sealing ring assembly shown in the prior patent possesses certain shortcomings which are overcome by the present assembly.

The sealing ring assembly of a rotary face seal is subject to centrifugal and thermal expansion forces which tend to distort the surfaces thereof that establish sealing relationship with the rotatable shaft and with the mating ring, causing excessive and uneven wear, leakage and vibration. The present sealing ring assembly employs structure which in large measure avoids the problems due to centrifugal and thermal expansion forces.

SUMMARY OF THE INVENTION

The invention comtemplates a sealing ring assembly for a rotary face seal, the assembly comprising a sealing ring having an inner cylindrical surface of diameter and smoothness providing a relatively rotatable, sealing relationship with a rotatable shaft and a lateral flat surface providing a relatively rotatable, sealing relationship with a stationary mating ring, and a stabilizing ring around the outer cylindrical surface of the sealing ring, the stabilizing ring snugly engaging the sealing ring and having integral circumferentially extending fin means. The purpose of the fin means is to reinforce the assembly so there will be high resistance to forces, such as centrifugal and thermal expansion forces, tending to distort the cylindrical and flat sealing surfaces of the sealing ring, and to provide a high heat dissipation characteristic.

In one illustrated embodiment of the invention, the fin means of the stabilizing ring is a single circumferential fin located centrally of the ring.

In another embodiment of the invention the fin means is a pair of spaced circumferential fins.

In still another embodiment of the invention the fin means is a plurality (three or more) of uniformly spaced circumferential fins.

In all embodiments, the circumferential fin means of the stabilizing ring is effective to reinforce the assembly mechanically so as to avoid distortions of the sealing surfaces of the sealing ring due to centrifugal and thermal expansion forces, such distortions, for example, being those that give a non-cylindrical shape to the inner cylindrical surface which establishes the relatively rotatable sealing relationship with the rotatable shaft, and a non-flat shape to the lateral flat surface which engages the mating ring to provide a radial seal. Also, the fin means in all embodiments improves the heat dissipation characteristic of the assembly, thereby reducing forces due to thermal expansion.

DESCRIPTION OF THE PREFERRED EMBODIMENTS

Figure 1:
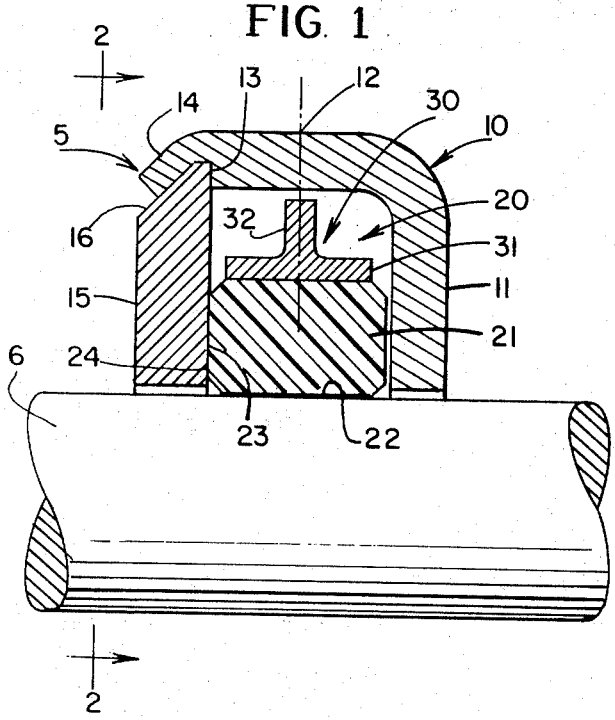
FIG. 1 is a sectional view on a radial plane through one-half of a rotary face seal employing a sealing ring assembly embodying the invention.
Figure 2:
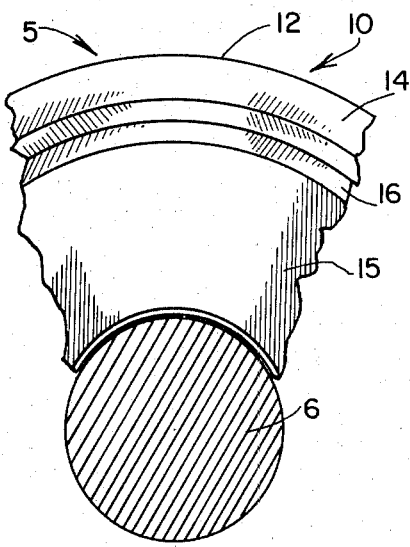
FIG. 2 is a fragmentary elevational view of the face seal shown in FIG. 1, partly in section on line 2—2 of FIG. 1.

Referring first to FIG. 1 of the drawing, a rotary face seal employing a sealing ring assembly embodying the invention is generally designated 5. Face seal 5 is shown mounted on a rotatable shaft 6, which shaft, for example, may be a turbine shaft and rotate at speeds of the order of 50,000 revolutions per minute.

Face seal 5 includes an annular housing 10 which, as shown, is L-shaped in radial cross-section, the radial leg 11 thereof adjacent shaft 6 having generous clearance with the shaft so as never to have engagement therewith. Other leg 12 which is concentric with shaft 6 has a radial shoulder 13 spaced inwardly from the free end, the end region 14 between the free end and shoulder 13 being reduced in thickness and bendable for a purpose next described.

A mating ring 15 having a conical periphery at least in part as shown at 16 surrounds shaft 6 with generous clearance and nests against shoulder 13 of housing leg 12. At final assembly, reduced end region 14 of leg 12 is bent into engagement with conical surface 16 to secure mating ring 15 to housing 10, as shown in FIG. 1.

A sealing ring assembly embodying the invention, generally designated 20, is located in the space defined by housing 10, mating ring 15 and the shaft 6 with which face seal 5 is used. Assembly 20 comprises a sealing ring 21, usually made of carbon material or equivalent, having an inner cylindrical surface 22 of diameter and smoothness which provide a relatively rotatable, sealing relationship between ring and shaft. The clearance between ring and shaft shown in FIG. 1 is exaggerated for purposes of illustration.

Sealing ring 21 and the stabilizing ring presently to be described are designed from the standpoints of dimensions and choice of materials so ring 21, due to thermal expansion changes in dimension, will not grip shaft 6 positively and thereby be subject to rotation at shaft speed. However, the clearance between ring and shaft is extremely small so as to provide a sealing relationship, and as a result ring 21 at times will rotate and have relative rotation with shaft 6.

Sealing ring 21 has at least one lateral surface, for example surface 23, of flat shape, usually formed by a lapping operation or the like so as to have a high degree of flatness and smoothness. Surface 23, as shown in FIG. 1, is adapted to engage cooperating flat, smooth surface 24 of mating ring 15 to provide a radial seal which may have relative rotation at times between surfaces 23 and 24.

In order to maintain the sealing relationship established by inner cylindrical surface 22 and lateral surface 23 of sealing ring 21, it is essential that there be no significant distortions in the two surfaces. Sealing ring 21, as mentioned, at times rotates, sometimes at high speed, thereby subjecting the sealing ring to centrifugal forces. Also, sealing ring 21 at times is subjected to temperature variation, including high temperatures. Thus, sealing ring 21 experiences forces resulting from thermal expansion. Both types of forces tend to distort the shapes of sealing surfaces 22 and 23.

The tendency toward distortion of sealing surfaces 22 and 23 is resisted effectively by a stabilizing ring 30, usually made of metallic material, mounted snugly with a press fit on the outer cylindrical surface of sealing ring 21. The axial length of stabilizing ring 30 is slightly less than that of sealing ring 21, as shown in FIG. 1.

Stabilizing ring 30 comprises an annular band 31 and a circumferential fin means 32 integral with annual band 31. As shown in FIG. 1, circumferential fin means 32 is a single circumferential fin centrally located on the exterior surface of band 31.

Fin means 32 reinforces annual band 31 and provides a stabilizing ring which effectively resists the tendency of the centrifugal and thermal expansion forces to distort surfaces 22 and 23 of sealing ring 21. In addition to mechanical reinforcement, fin means 32 imparts to the assembly of sealing ring 21 and stabilizing ring 30 a high heat dissipation characteristic. As a result of the latter, thermal expansion of the materials in assembly 20 is reduced, and the thermal expansion forces that tend to distort surfaces 22 and 23 are correspondingly reduced.

Figure 3:
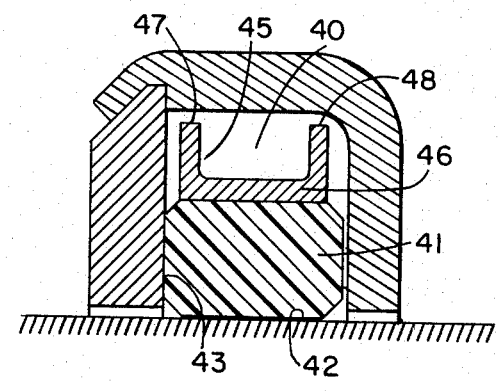
FIG. 3 is a sectional view on a radial plane through one-half of a rotary face seal employing a modified form of sealing ring assembly.

Referring to FIG. 3, a modified form of sealing ring assembly is designated 40. It comprises a sealing ring 41, generally similar to previously described sealing ring 21, with inner cylindrical sealing surface 42 and lateral flat sealing surface 43, and a stabilizing ring 45. The latter comprises an annular band 46, similar to annular band 31, and integral circumferential fin means comprising a pair of spaced circumferential fins 47 and 48 on the exterior surface of band 46. The two fins 47 and 48 provide increased mechanical reinforcement of stabilizing ring 45 to resist the centrifugal and thermal expansion forces, and also provide increased heat dissipation, thereby reducing the thermal expansion forces.

Figure 4:
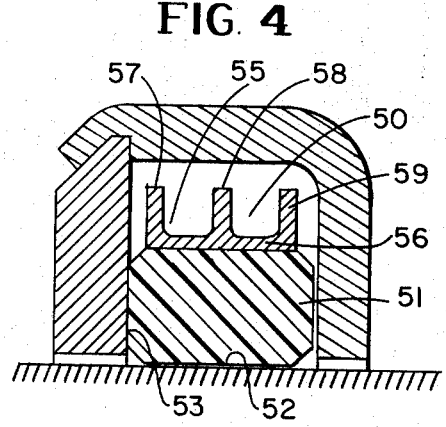
FIG. 4 is a sectional view on a radial plane through one-half of a rotary face seal employing still another modified form of sealing ring assembly.

Referring to FIG. 4, another modified sealing ring assembly, generally designated 50, comprises a sealing ring 51 with cylindrical and flat sealing surfaces 52 and 53, and a stabilizing ring 55. The ring 55 includes an annular band 56 and circumferential fin means comprising three spaced circumferential fins 57, 58 and 59 which provide increased reinforcement and high heat dissipation.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A sealing ring assembly for a rotary face seal, comprising:
   a sealing ring having an inner cylindrical surface of diameter and smoothness providing relatively rotatable, sealing relationship with a rotatable shaft and a lateral flat surface providing relatively rotatable, sealing relationship with a stationary mating ring; and
   a stabilizing ring in press fit relationship around the outer cylindrical surface of said sealing ring, said stabilizing ring snugly engaging said sealing ring and having integral circumferential fin means,
   whereby said assembly has high resistance to forces tending to distort said cylindrical and flat sealing surfaces, and a high heat dissipation characteristic.

2. The sealing ring assembly of claim 1 wherein said integral circumferential fin means is a single circumferential fin located centrally of said stabilizing ring.

3. The sealing ring assembly of claim 1 wherein said integral circumferential fin means is a pair of spaced circumferential fins.

4. The sealing ring assembly of claim 1 wherein said integral circumferential fin means is a plurality of uniformly spaced circumferential fins.

\* \* \* \* \*